United States Patent
Iwasa

(10) Patent No.: US 8,259,200 B2
(45) Date of Patent: Sep. 4, 2012

(54) IMAGING APPARATUS AND IMAGING METHOD

(75) Inventor: Hiroshi Iwasa, Kanagawa (JP)

(73) Assignee: Sony Corporation (JP)

( * ) Notice: Subject to any disclaimer, the term of this patent is extended or adjusted under 35 U.S.C. 154(b) by 225 days.

(21) Appl. No.: 12/657,795

(22) Filed: Jan. 27, 2010

(65) Prior Publication Data

US 2010/0194938 A1  Aug. 5, 2010

(30) Foreign Application Priority Data

Jan. 28, 2009 (JP) ................ P2009-016831

(51) Int. Cl.
*H04N 9/07* (2006.01)
*H04N 5/235* (2006.01)

(52) U.S. Cl. ........... 348/270; 348/362

(58) Field of Classification Search ........ 348/266–273, 348/221.1, 362, 364, 70, 93, 201, 199, 222.1
See application file for complete search history.

(56) References Cited

U.S. PATENT DOCUMENTS

| | | | | |
|---|---|---|---|---|
| 5,325,190 | A * | 6/1994 | Nagasaki et al. | 348/270 |
| 7,839,437 | B2 * | 11/2010 | Kasai et al. | 348/238 |
| 7,869,936 | B2 * | 1/2011 | Donatelli et al. | 701/118 |
| 2006/0115230 | A1 | 6/2006 | Komoguchi et al. | |
| 2008/0012969 | A1 * | 1/2008 | Kasai et al. | 348/266 |
| 2008/0079031 | A1 | 4/2008 | Tani | |
| 2008/0173794 | A1 * | 7/2008 | Oike et al. | 250/208.1 |
| 2010/0104209 | A1 * | 4/2010 | Deever et al. | 382/260 |

FOREIGN PATENT DOCUMENTS

| | | |
|---|---|---|
| JP | 05-161145 A | 6/1993 |
| JP | 07322271 A | 12/1995 |
| JP | 09163384 A | 6/1997 |
| JP | 2001327465 A | 11/2001 |
| JP | 2007214832 A | 8/2007 |
| JP | 2007306447 A | 11/2007 |
| JP | 2008-210975 | 9/2008 |

OTHER PUBLICATIONS

Office Action from Japanese Application No. 2009-016831, dated Sep. 6, 2011.
Office Action from Japanese Application No. 2009-016831, dated Nov. 30, 2010.

* cited by examiner

*Primary Examiner* — Chieh M Fan
*Assistant Examiner* — Ahmed A Berhan
(74) *Attorney, Agent, or Firm* — Lerner, David, Littenberg, Krumholz & Mentlik, LLP

(57) ABSTRACT

An imaging apparatus includes: an imaging section receiving color light and interpolation light including at least a part of a wavelength range of the color light in order to interpolate the brightness of the color light and converting the received color light and interpolation light into a signal; a control section controlling a first exposure time of the color light and a second exposure time of the interpolation light separately according to the brightness of an object to be imaged; and an image creating section creating an image on the basis of a color signal, which is output when the imaging section receives the color light, during the first exposure time controlled by the control section and on the basis of an interpolation signal, which is output when the imaging section receives the interpolation light, during the second exposure time controlled by the control section.

9 Claims, 10 Drawing Sheets

SRST

STRN

SSEL

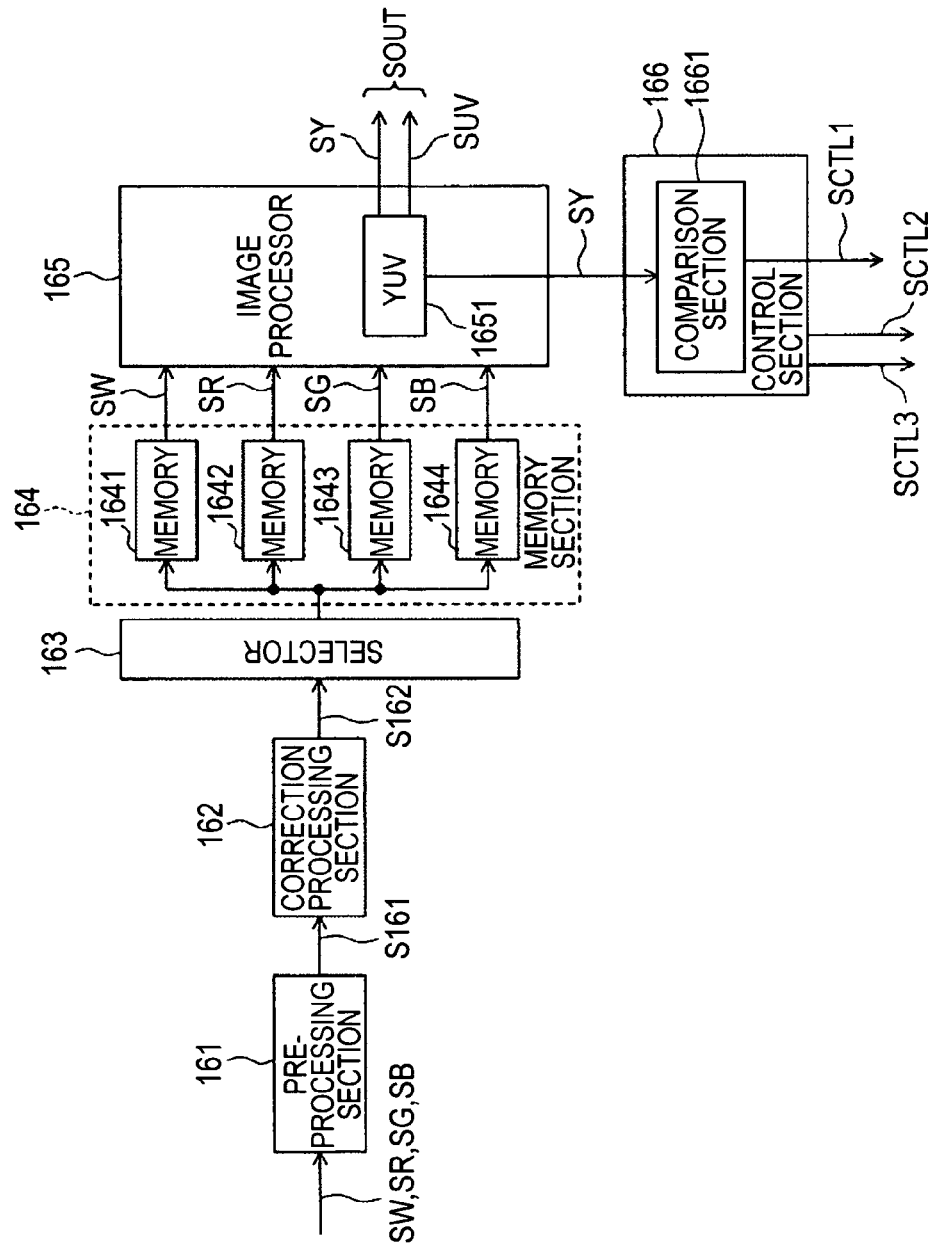

FIG.7

| | BRIGHTNESS OF SUBJECT | EXPOSURE TIME OF WHITE LIGHT | FRAME RATE (FPS) | SENSITIVITY (RELATIVE VALUE) |
|---|---|---|---|---|
| STANDARD CONDITION | 1.0 TIME | 1 TIME | 60 | 2.2 |
| NON-STANDARD CONDITION | 0.65 TIME | 2 TIME | 48 | 3.4 |
| | 0.39 TIME | 4 TIME | 34 | 5.7 |

IMAGING APPARATUS AND IMAGING METHOD

CROSS-REFERENCE TO RELATED APPLICATION

The present application claims priority from Japanese Patent Application No. JP 2009-016831 filed in the Japanese Patent Office on Jan. 28, 2009, the entire content of which is incorporated herein by reference.

BACKGROUND OF THE INVENTION

1. Field of the Invention

The present invention relates to an imaging apparatus and an imaging method of performing imaging in a field sequential method, for example.

2. Description of the Related Art

A field sequential imaging apparatus which performs imaging using a rotary optical filter is known (see JP-A-2003-333606). Since not only the field sequential imaging apparatus can be manufactured at low cost, but also the field sequential imaging apparatus is excellent in resolution, the field sequential imaging apparatus is used in many fields, such as an endoscope.

An optical filter can transmit red, green, and blue light beams therethrough. By rotation of the optical filter around its center, light beams of three primary colors are sequentially incident on an imaging section. In addition, the imaging section receives light beams of three primary colors and generates a pixel signal (pixel data) corresponding to each color by photoelectric conversion. In the field sequential imaging apparatus, a pixel signal of one color is generated in every pixel. Accordingly, a color image can be obtained by mixing the pixel signals of respective colors.

BRIEF SUMMARY OF THE INVENTION

When a subject to be imaged is dark, it is necessary to adjust exposure time. For example, if the exposure time of red light, green light, and blue light is doubled, the sensitivity of the imaging section is improved about twice.

In this case, however, the resolution over time, that is, the frame rate is reduced to half. As a result, a disadvantage occurs in that the quality of a color image noticeably deteriorates.

Therefore, it is desirable to provide an imaging apparatus and an imaging method capable of improving the quality of a color image even if a subject to be imaged is dark.

According to an embodiment of the present invention, there is provided an imaging apparatus including: an imaging section which receives color light and interpolation light including at least a part of a wavelength range of the color light in order to interpolate the brightness of the color light and which converts each of the received color light and interpolation light into a signal; a control section which controls a first exposure time of the color light and a second exposure time of the interpolation light separately according to the brightness of an object to be imaged, which is to be imaged by the imaging section; and an image creating section which creates an image on the basis of a color signal, which is output when the imaging section receives the color light, during the first exposure time controlled by the control section and on the basis of an interpolation signal, which is output when the imaging section receives the interpolation light, during the second exposure time controlled by the control section.

According to another embodiment of the present invention, there is provided an imaging method including the steps of: controlling a first exposure time of color light and a second exposure time of interpolation light, which includes at least a part of a wavelength range of the color light in order to interpolate the brightness of the color light, separately according to the brightness of an object to be imaged; receiving the color light and the interpolation light and converting each of the received color light and interpolation light into a signal under the control; and creating an image on the basis of a color signal, which is output when the color light is received, during the first exposure time under the control and on the basis of an interpolation signal, which is output when the interpolation light is received, during the second exposure time under the control.

According to the embodiments of the present invention, the control section controls the first exposure time of the color light and the second exposure time of the interpolation light separately according to the brightness of the object to be imaged.

During the first exposure time controlled by the control section, the imaging section receives the color light, converts the color light into a color signal, and then outputs the color signal to the image creating section. In addition, during the second exposure time controlled by the control section, the imaging section receives the interpolation light, converts the interpolation light into an interpolation signal, and then outputs the interpolation signal to the image creating section.

Then, the image creating section creates an image on the basis of the color signal and the interpolation signal input from the imaging section.

According to the embodiments of the present invention, the quality of a color image can be improved even if a subject to be imaged is dark.

BRIEF DESCRIPTION OF THE DRAWINGS

FIG. 6 is a block diagram showing an example of the configuration of a signal processor in the first embodiment of the present invention;

FIG. 7 is a view illustrating an exposure control function of a control section in the first embodiment of the present invention;

DETAILED DESCRIPTION

Hereinafter, embodiments of the present invention will be described with reference to the accompanying drawings. In addition, the explanation will be performed in the following order.

1. First Embodiment (Imaging Using an Optical Filter)
2. Second Embodiment (Imaging Using a Light Source)

<1. First Embodiment>

[Example of the Configuration of an Imaging Apparatus]

Figure 1:
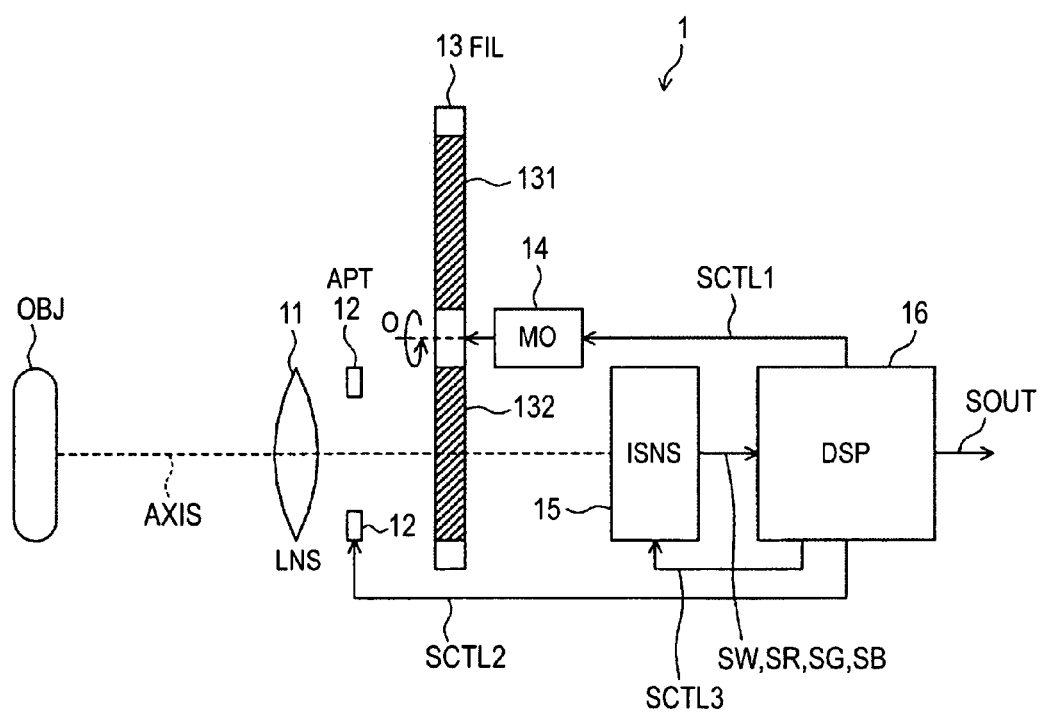
FIG. 1 is a block diagram schematically showing an example of the configuration of an imaging apparatus according to a first embodiment of the present invention.

FIG. 1 is a block diagram schematically showing an example of the configuration of an imaging apparatus according to a first embodiment of the present invention. In FIG. 1, only main sections of an imaging apparatus 1 are shown.

As shown in FIG. 1, the imaging apparatus 1 includes a lens (LNS) 11, an aperture (APT) 12, an optical filter (FIL) 13, a motor (MO) 14, an imaging section (ISNS) 15, and a signal processor (DSP) 16.

In addition, the signal processor 16 corresponds to a control section and an image creating section of the present invention. The optical filter 13 corresponds to a filter section of the present invention.

The imaging apparatus 1 is a field sequential imaging apparatus. The imaging apparatus 1 creates a color image by mixing color light transmitted through the rotary optical filter 13 with a pixel signal (image data) of each color imaged by white (W) light using the signal processor 16.

The color light indicates light beams of three primary colors of red (R), green (G), and blue (B), for example. Red light (first color light) is an electromagnetic wave with a wavelength $\lambda$ of about 600 nm to 700 nm. Green light (second color light) is an electromagnetic wave with a wavelength $\lambda$ of about 500 nm to 600 nm. Blue light (third color light) is an electromagnetic wave with a wavelength $\lambda$ of about 400 nm to 500 nm. White light (interpolation light) is visible light with a wavelength $\lambda$ of about 380 nm to 780 nm. Accordingly, white light includes light of at least one of the three primary colors. The color light may be light of complementary colors, such as yellow (Ye), magenta (Mg), and cyan (Cy).

The lens 11 is formed of an optical material, such as quartz or sapphire which allows light to be transmitted therethrough. The lens 11 forms an image of a subject OBJ on a pixel portion of the imaging section 15.

In addition, light condensed by the lens 11 may include infrared light, for example. For example, infrared light can be blocked by disposing an infrared cut filter (not shown) between the lens 11 and the aperture 12. For example, high-frequency components equal to or higher than the Nyquist frequency can be blocked by disposing an optical low pass filter (not shown) between the lens 11 and the aperture 12.

The aperture 12 adjusts the amount of light that the pixel portion (imaging surface) of the imaging section 15 receives through the lens 11.

Figure 2:
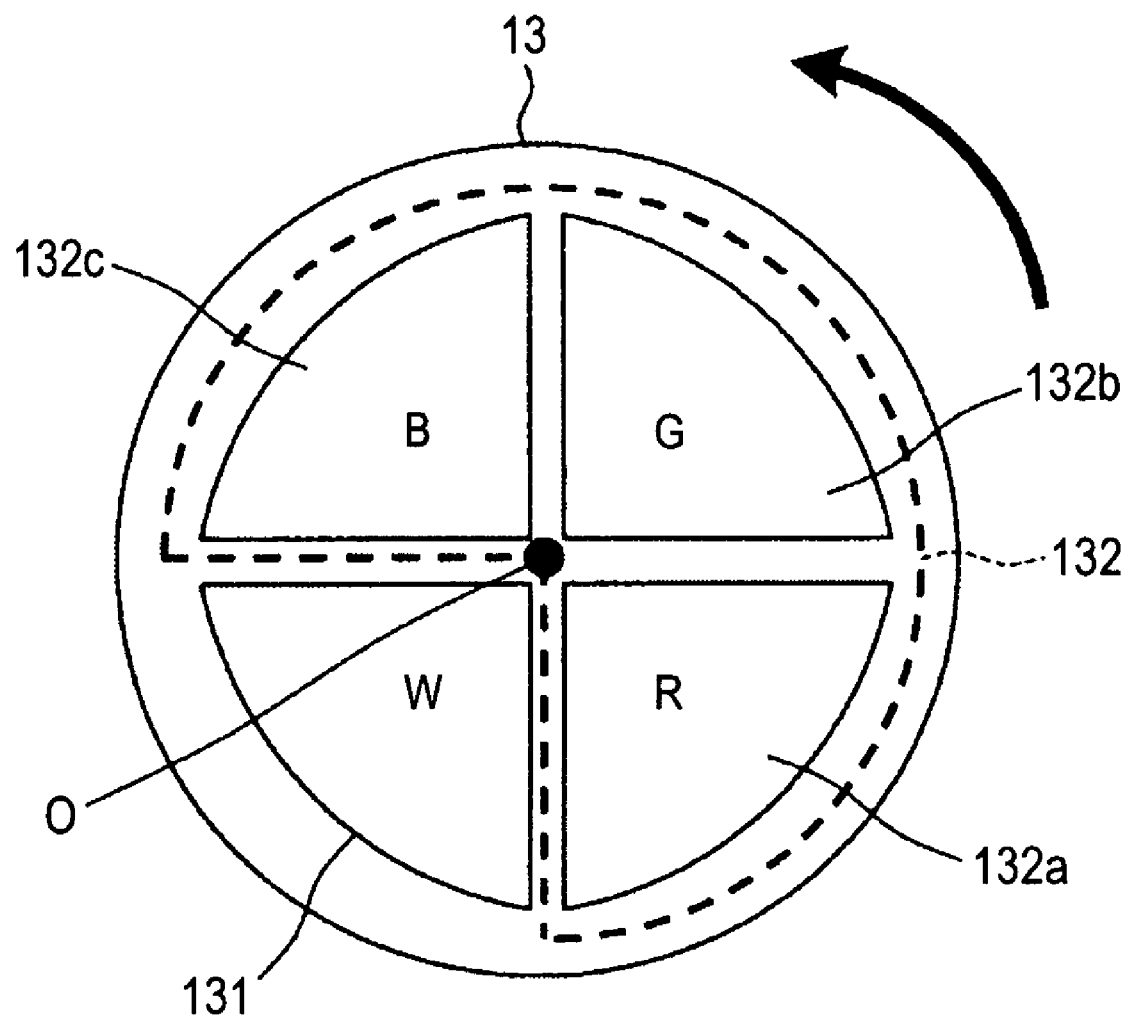
FIG. 2 is a schematic view showing an example of the configuration of an optical filter in the first embodiment of the present invention.

The optical filter 13 has a disc-like shape (see FIG. 2). A white filter 131 which transmits white light and a color filter 132 which transmits color light are formed on the disc surface. The color filter 132 is configured to include a red filter, a green filter, and a blue filter, which will be described later in detail.

A rotary shaft of the motor 14 is attached to the optical filter 13 so that the optical filter 13 can rotate around the axial center ○ in the circumferential direction. Here, the optical filter 13 is disposed between the aperture 12 and the imaging section 15 so that one of the filters is located on an optical axis AXIS. The imaging apparatus 1 makes the color light and the white light, among light beams condensed by the lens 11, selectively incident on the imaging section 15 by rotating the optical filter 13 around the axial center ○.

The motor 14 is preferably a stepping motor. The rotary shaft of the motor 14 is attached to the axial center ○ of the optical filter 13 in order to make the optical filter rotate around the axial center ○ in the normal rotation direction. The rotary shaft of the motor 14 can be stopped at a desired position by a control signal SCTL1 supplied from the signal processor 16. Accordingly, color light and white light can be selectively incident on the imaging section 15 at predetermined time intervals.

A CMOS (Complementary Metal Oxide Semiconductor) image sensor capable of performing imaging in the field sequential method is selected as an example of the imaging section 15. Instead of the CMOS image sensor, for example, a CCD (Charge Coupled Device), an MOS (Metal Oxide Semiconductor) type image sensor, or a CMD (Charge Modulation Device) may be selected as the imaging section 15.

The imaging section 15 converts incident light into an electric signal according to the amount of light by photoelectric conversion. Since the imaging is performed in the field sequential method, red light, green light, blue light, and white light transmitted through the optical filter are sequentially incident on the imaging section 15. Accordingly, an image imaged for every color is obtained. An image imaged by white light is a monochrome image based on a white color, that is, variation of luminance. For example, an image imaged by red light is an image with a red component.

Specifically, the imaging section 15 generates an analog signal for every color when the color light is received. The analog signal is converted into a digital signal by a column processing circuit (see FIG. 3) of the imaging section 15. The imaging section 15 outputs the digital signal corresponding to each color to the signal processor 16 as a pixel signal. Similar to the case where color light is received, the imaging section 15 outputs a pixel signal of white color to the signal processor 16 when the white light is received.

For convenience of explanation, it is assumed that an image of a white component imaged by white light is a white pixel signal (interpolation signal) SW. An image of a red component imaged by red light is assumed to be a red pixel signal SR. An image of a green component imaged by green light is assumed to be a green pixel signal SG. An image of a blue component imaged by blue light is assumed to be a blue pixel signal SB. The pixel signal SR, the pixel signal SG, and the pixel signal SB are also simply called color pixel signals (color signals).

The signal processor 16 has a control function of controlling the main sections of the imaging apparatus 1 and an image processing function of performing image processing. The control function includes an aperture control function of controlling the aperture 12, an exposure control function of controlling the exposure time by controlling the motor 14, and a gain control function of controlling the gain of the imaging section 15.

First, the outline of the exposure control function will be described. Since the imaging apparatus 1 performs imaging using the optical filter 13, it is possible to control the exposure time of color light and the exposure time of white light separately according to the brightness of the subject (object to be imaged) OBJ to be imaged. The brightness of the subject OBJ means the brightness of light received by the imaging section 15. For example, luminance is used as an index of the brightness. The signal processor 16 determines whether or not the brightness of the subject OBJ to be imaged is lower than the brightness of the subject OBJ in a standard condition.

In addition, the standard condition means a condition where the subject OBJ can be imaged in a common exposure time. In the standard condition, the exposure time ratio of exposure time (Rt) of red light, exposure time (Gt) of green light, exposure time (Bt) of blue light, and exposure time (Wt) of white light is Rt:Gt:Bt:Wt=1:1:1:1. In the standard condition, it is possible to perform the imaging in such an exposure time ratio.

In a condition which is not the standard condition, that is, in a condition where the brightness of the subject OBJ to be imaged is lower than the brightness in the standard condition, exposure is insufficient. Such a condition is referred to as a non-standard condition.

Therefore, when the determination result that the subject OBJ is dark is obtained, the signal processor 16 controls the exposure time such that only the exposure time of white light is longer than that in the standard condition.

A specific example of the exposure control in the non-standard condition will be described. The signal processor 16 increases only the exposure time (second exposure time) of white light to twice the exposure time (first exposure time) of color light according to the brightness of the subject OBJ to be imaged. That is, the exposure time ratio is Rt:Gt:Bt:Wt=1:1:1:2.

In this case, the signal processor 16 controls the motor 14 such that the exposure time of white light becomes twice the exposure time of color light. Accordingly, a time for which the white filter 131 stands still on the optical axis AXIS is twice a time for which the color filter 132 stands still on the optical axis AXIS.

Next, the aperture function and the gain control function will be described. In the brightness control, for example, the aperture, the exposure time, and the gain of the imaging section 15 are suitably controlled. The signal processor 16 performs aperture control and gain control in addition to exposure control when controlling the brightness.

When the determination result that the subject OBJ is dark is obtained, the signal processor 16 outputs a control signal SCTL2 for opening the aperture to the aperture 12. In addition, the signal processor 16 outputs a control signal SCTL3 for increasing the gain of the imaging section 15 to the imaging section 15.

The outline of the image processing function will be described. Unlike the case where a color filter is provided on the imaging surface (pixel portion), the imaging section 15 receives light with the same color in all pixels and sequentially generates the pixel signals SR, SG, SB, and SW for every color. Accordingly, the signal processor 16 performs operation processing expressed by the following expressions to generate a color image from the pixel signals.

$$SRx^* = SRx \times \Delta \quad (1)$$

$$SGx^* = SGx \times \Delta \quad (2)$$

$$SBx^* = SBx \times \Delta \quad (3)$$

Here, $\Delta = (SRx + SGx + SBx + SWx)/(SRx + SGx + SBx)$ (4)

In the expressions (1) to (4), SRx, SGx, SBx, and SWx indicate a red pixel signal, a green pixel signal, a blue pixel signal, and a white pixel signal, respectively, in a pixel x (spatial position x) on arbitrary column and row. In the expressions (1) to (3), SRx*, SGx*, and SBx* indicate a red pixel signal, a green pixel signal, and a blue pixel signal, respectively, which form a color image to be created corresponding to the pixel x. In the expression (4), $\Delta$ indicates a correction value.

In a normal field sequential imaging apparatus, exposure using white light is not performed. For this reason, since the white filter 131 is not provided, the value of the pixel signal SWx is 0. In this case, the correction value $\Delta$ which is commonly included in the expressions (1) to (3) is 1. That is, pixel signals that a normal imaging apparatus is to generate are SRx*=SRx, SGx*=SGx, and SBx*=SBx.

On the other hand, in the imaging apparatus 1 according to the present embodiment, not only exposure using color light but also exposure using white light is performed. Accordingly, for the pixel signals SRx, SGx, and SBx of respective colors obtained by the imaging section 15, it is necessary to perform correction in consideration of the white pixel signal SWx.

Then, as shown in the expressions (1) to (3), the signal processor 16 multiplies the values of the pixel signals SRx, SGx, and SBx of respective colors by the correction value $\Delta$. Since the pixel signal SWx is included in the numerator of the correction value $\Delta$, the values of the pixel signals SRx*, SGx*, and SBx* to be generated are larger values than those in the normal imaging apparatus. Thus, the sizes of the pixel signals SRx*, SGx*, and SBx* to be generated are increased by the pixel signal SWx. In other words, the white light serves to interpolate the brightness of color light. The brightness is basically luminance.

This operation processing is performed for all pixels. The signal processor 16 creates a final color image by mixing the pixel signals SRx*, SGx*, and SBx*, which have been generated by the operation processing, for every pixel x.

[Specific Example of the Configuration of the Optical Filter 13]

An example of the configuration of the optical filter 13 will be described with reference to FIG. 2.

FIG. 2 is a schematic view showing an example of the configuration of the optical filter according to the first embodiment of the present invention. FIG. 2 shows the optical filter 13 seen from the surface direction thereof.

As shown in FIG. 2, the white filter (interpolation filter) 131 which transmits white light and the color filter 132 which transmits color light are formed in the optical filter 13 formed in a disc shape.

Specifically, the color filter 132 is formed by a red filter (first filter) 132a, a green filter (second filter) 132b, and a blue filter (third filter) 132c.

The red filter 132a is a filter which transmits red light. The green filter 132b is a filter which transmits green light. The blue filter 132c is a filter which transmits blue light. Portions other than the white filter 131 and the filters 132a to 132c of respective colors are formed by a member capable of blocking light.

The white filter 131, the red filter 132a, the green filter 132b, and the blue filter 132c have approximately fan shapes and have approximately the same area. These filters are formed at equal positions on the disc surface of the optical filter 13. Each of the filters has an area sufficient to cover the pixel portion of the imaging section 15.

The rotary shaft of the motor 14 is attached to the axial center ○ of the optical filter 13. The optical filter rotates around the axial center ○ with rotation of the motor 14. The rotation direction of the optical filter 13 is a counterclockwise direction, for example.

When the white filter 131 exists on the optical axis AXIS, the white filter 131 transmits white light among incident light beams. As a result, the imaging section 15 receives the white light.

When the red filter 132a exists on the optical axis AXIS, the red filter 132a transmits red light among the incident light beams. As a result, the imaging section 15 receives the red light.

When the green filter 132b exists on the optical axis AXIS, the green filter 132b transmits green light among the incident light beams. As a result, the imaging section 15 receives the green light.

When the blue filter 132c exists on the optical axis AXIS, the blue filter 132c transmits blue light among the incident light beams. As a result, the imaging section 15 receives the blue light.

The imaging section 15 receives the light in order of red light, green light, blue light, white light, red light, . . . , and generates the pixel signals SR, SG, SB, and SW of respective colors.

In addition, the white filter 131 may be removed so that the white light is directly incident on the pixel portion of the imaging section 15 in a region of the white filter 131.

[Specific Example of the Configuration of the Imaging Section 15]

A specific example of the configuration of the imaging section 15 will be described with reference to FIG. 3.

Figure 3:
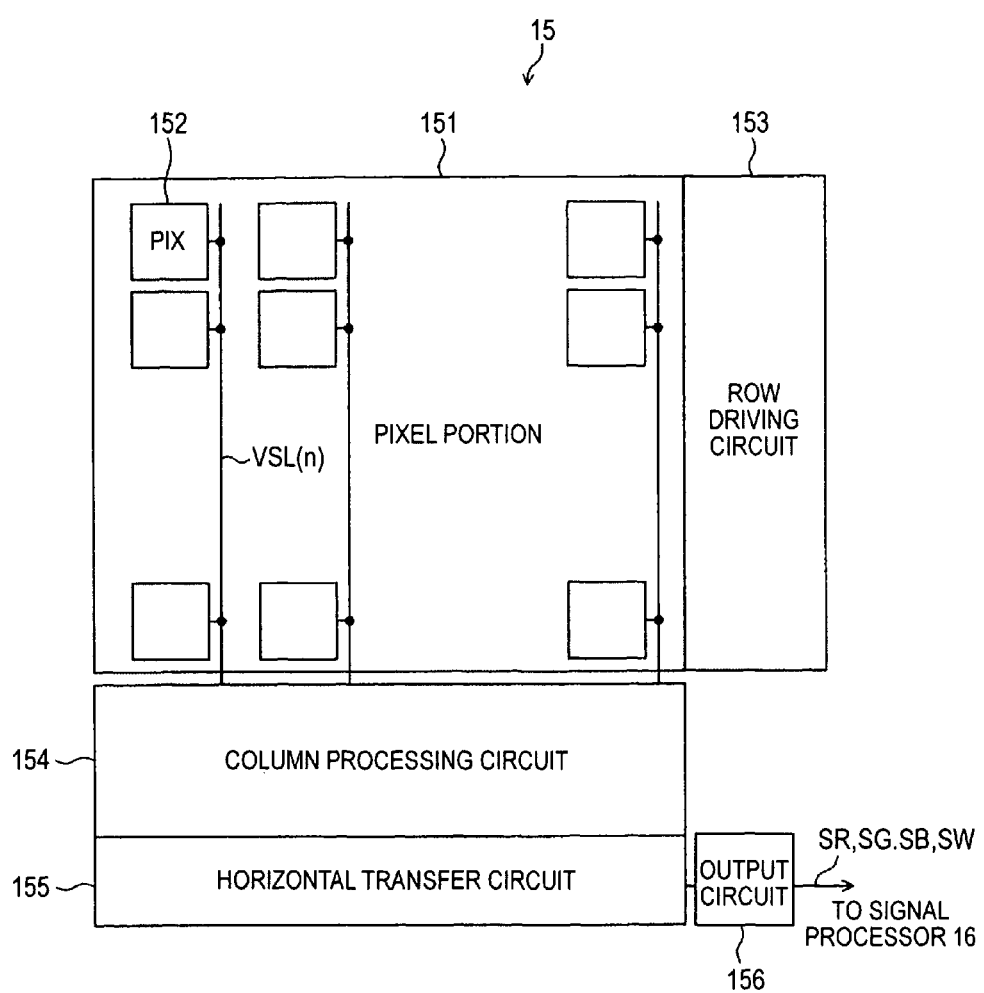
FIG. 3 is a block diagram schematically showing an example of the configuration of an imaging section in the first embodiment of the present invention.

FIG. 3 is a block diagram schematically showing an example of the configuration of the imaging section in the first embodiment of the present invention. In addition, FIG. 3 shows a CMOS image sensor as an example of the imaging section 15.

As shown in FIG. 3, the imaging section 15 has a pixel portion 151, a pixel (PIX) 152, a row driving circuit 153, a column processing circuit 154, a horizontal transfer circuit 155, and an output circuit 156. These components are formed in one semiconductor chip.

The pixel portion 151 is a pixel region where incident light is received. In the pixel portion 151, 'm (row direction)×n (column direction)' pixels 152 are arrayed in a matrix. Since the imaging section 15 performs imaging in a field sequential method, no color filter is provided in the pixel portion 151.

Figure 4:
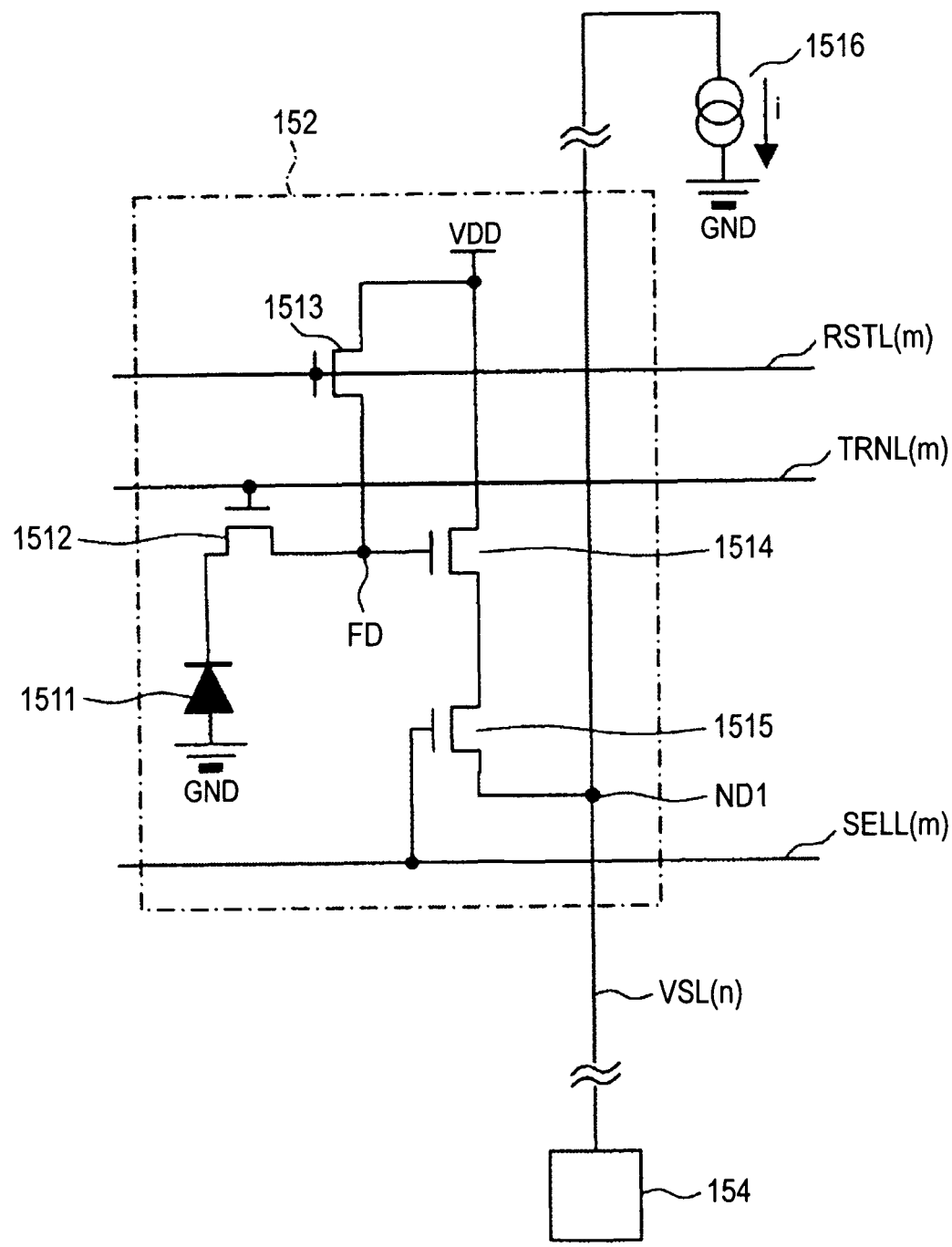
FIG. 4 is an equivalent circuit diagram showing an example of the configuration of a pixel in the first embodiment of the present invention.

A transfer signal line, a reset signal line, a selection signal line, and the like are commonly connected to the pixels 152 on the m-th row in order to drive the pixels 152 (see FIG. 4). A vertical signal line VSL(n) is commonly connected to the pixels 152 on the n-th column.

The pixel 152 on the m-th row and n-th column converts incident light into an electric charge (electron) by photoelectric conversion and outputs the electric charge to the vertical signal line VSL(n) as an analog signal.

The row driving circuit 153 selects the pixel 152 in a row unit and drives each pixel 152 on the selected row. When the row driving circuit 153 drives each pixel 152 on the m-th row, the pixel 152 on the m-th row and n-th column outputs the analog signal generated by photoelectric conversion to the vertical signal line VSL(n).

The column processing circuit 154 has an ADC (Analog Digital Converter) circuit (not shown) for every column, for example. Each ADC circuit converts the analog signal transmitted to the vertical signal line VSL(n) into a digital signal (AD conversion).

In this case, the column processing circuit 154 reads an analog signal from the pixel 152 on the selected row twice for one pixel period of one horizontal scanning period (horizontal blanking period). In addition, the column processing circuit 154 removes reset noise and the like by performing CDS (Correlated Double Sampling) processing on the analog signal.

Then, the column processing circuit 154 outputs the digital signal to the output circuit 156 through the horizontal transfer circuit 155.

The horizontal transfer circuit 155 selects column addresses sequentially and reads the digital signals from the column processing circuit 154. Then, the horizontal transfer circuit 155 outputs the digital signals, which have been read sequentially, to the output circuit 156.

The output circuit 156 amplifies the digital signals input from the horizontal transfer circuit 155 and outputs the digital signals to the signal processor 16, which is provided outside the imaging section 15, as the pixel signals SR, SG, SB, and SW.

[Specific Example of the Configuration of the Pixel 152]

An example of the configuration of the pixel 152 will be described with reference to FIG. 4.

FIG. 4 is an equivalent circuit diagram showing an example of the configuration of a pixel in the first embodiment of the present invention. The pixel 152 on the n-th row and m-th column is shown in FIG. 4.

As shown in FIG. 4, the pixel 152 has a photoelectric conversion element 1511 formed by a photodiode, a transfer transistor 1512, a reset transistor 1513, an amplifying transistor 1514, and a selection transistor 1515.

An anode side of the photoelectric conversion element 1511 is grounded (GND), and a cathode side of the photoelectric conversion element 1511 is connected to a source of the transfer transistor 1512. The photoelectric conversion element 1511 photoelectrically converts incident light into an electric charge (electron) according to the amount of light and stores the electric charge.

An n-channel insulated gate field effect transistor is selected as an example of each transistor. Each transistor adopts the following topology.

The source of the transfer transistor 1512 is connected to the cathode side of the photoelectric conversion element 1511. A drain of the transfer transistor 1512 is connected to a floating diffusion FD. A gate of the transfer transistor 1512 is connected to a transfer signal line TRNL(m).

The transfer transistor 1512 transmits to the floating diffusion FD an electric charge stored in the photoelectric conversion element 1511.

The drain of the transfer transistor 1512, a source of the reset transistor 1513, and a gate of the amplifying transistor 1514 are commonly connected to the floating diffusion FD.

The source of the reset transistor 1513 is connected to the floating diffusion FD. A drain of the reset transistor 1513 is connected to a power supply voltage VDD. A gate of the reset transistor 1513 is connected to a reset signal line RSTL(m).

The reset transistor 1513 resets the electric potential of the floating diffusion FD to the power supply voltage VDD.

A source of the amplifying transistor 1514 is connected to a drain of the selection transistor 1515. A drain of the amplifying transistor 1514 is connected to the power supply voltage VDD. The gate of the amplifying transistor 1514 is connected to the floating diffusion FD.

The amplifying transistor 1514 amplifies the electric potential of the floating diffusion FD.

A source of the selection transistor 1515 is connected to a vertical signal line VSL(n) at a node ND1. The drain of the selection transistor 1515 is connected to the source of the amplifying transistor 1514. A gate of the selection transistor 1515 is connected to a selection signal line SELL(m).

The selection transistor 1515 is turned on at the time of reading of an electric charge of the pixel 152 and outputs the analog signal voltage amplified by the amplifying transistor 1514 to the vertical signal line VSL(n).

A constant current source circuit 1516 is connected to the vertical signal line VSL(n). The amplifying transistor 1514 and the constant current source circuit 1516 form a source follower circuit.

[Method of Driving the Pixel 152]

A method of driving the pixel 152 will be described.

Figure 5A:
FIGS. 5A to 5C are timing charts showing an example of a method of driving a pixel in the first embodiment of the present invention.
Figure 5B:
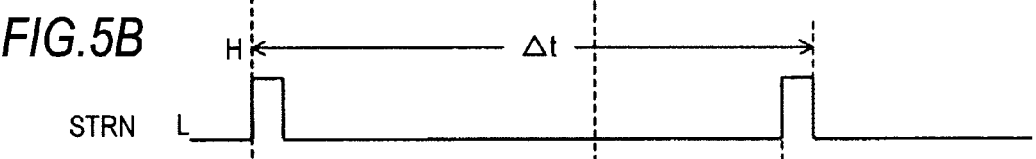
Figure 5C:
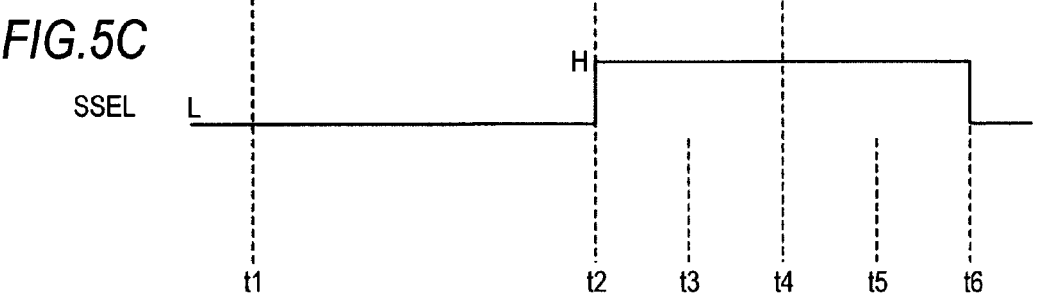

FIGS. 5A to 5C are timing charts showing an example of a method of driving a pixel in the first embodiment of the present invention.

FIG. 5A shows a reset signal SRST. FIG. 5B shows a transfer signal STRN. FIG. 5C shows a selection signal SSEL.

At time t1, the row driving circuit 153 is assumed to select each pixel 152 on the m-th row. In this case, the row driving circuit 153 supplies a pulsed reset signal to the reset signal line RSTL(m), as shown in FIG. 5A. At the same time, the row driving circuit 153 supplies the pulsed transfer signal STRN to the transfer signal line TRNL(m), as shown in FIG. 5B.

As a result, the transfer transistor 1512 and the reset transistor 1513 are simultaneously turned on during a period of the pulse width. Then, an electric charge stored in the photoelectric conversion element 1511 is transmitted to the floating diffusion FD. Then, the electric charge stored in the photoelectric conversion element 1511 is discharged to the power supply voltage VDD, and the electric potential of the floating diffusion FD is reset to the power supply voltage VDD. Resetting of the electric potential of the floating diffusion FD to the power supply voltage VDD as described above is called "reset".

After execution of the reset, the photoelectric conversion element 1511 starts to receive incident light and store the electric charge. From time t2 to time t6, the row driving circuit 153 supplies the high-level selection signal SSEL to the selection signal line SELL(m), as shown in FIG. 5C. Time t6 is a time when an operation of reading an electric charge ends.

Accordingly, the selection transistor 1515 of the pixel 152 holds an ON state until a read operation of electric charges of the pixels 152 on the same row (selected row) ends.

At time t2, the row driving circuit 153 supplies the pulsed reset signal SRST to the reset signal line RSTL(m), as shown in FIG. 5A.

Then, the electric potential of the floating diffusion FD is reset by the power supply voltage VDD. Since the selection transistor 1515 is in an ON state, the electric potential of the floating diffusion FD is output to the vertical signal line VSL(n) as an analog signal voltage.

In this case, the analog signal transmitted to the vertical signal line VSL(n) is called a "reset signal" since the analog signal is a signal with a reset level by reset.

At time t3, reading of a first analog signal, that is, a reset signal is performed. At this time, the column processing circuit 154 reads the analog signal transmitted to the vertical signal line VSL(n) and performs AD conversion of the analog signal.

At time t4, the row driving circuit 153 supplies the pulsed transfer signal STRN to the transfer signal line TRNL(m), as shown in FIG. 5B. During a period of the pulse width, the transfer transistor 1512 is in an ON state, and the reset transistor 1513 holds an OFF state.

Then, an electric charge stored in the photoelectric conversion element 1511 is transmitted to the floating diffusion FD. In addition, the electric potential of the floating diffusion FD is amplified by the amplifying transistor 1514.

In the transfer signal STRN shown in FIG. 5B, a period Δt from a rising edge of the pulse at time t1 to a falling edge of the pulse at time t4 is called a "charge storage period" for which an electric charge is stored in the photoelectric conversion element 1511.

Since a source follower circuit is formed by the amplifying transistor 1514 and the constant current source circuit 1516 connected to the vertical signal line VSL(n) (refer to FIG. 4), a bias current flows between the constant current source circuit 1516 and the amplifying transistor 1514.

Accordingly, the amplified electric potential of the floating diffusion FD is output as an analog signal to the vertical signal line VSL(n) through the selection transistor 1515.

In this case, the analog signal transmitted to the vertical signal line VSL(n) is called a "stored signal" since the analog signal is a signal charge stored in the photoelectric conversion element 1511.

At time t5, reading of a second analog signal, that is, a stored signal is performed. At this time, the column processing circuit 154 reads the analog signal that the pixel 152 has output to the vertical signal line VSL(n) and performs AD conversion of the analog signal.

The column processing circuit 154 digitizes a difference between the reset signal read first and the stored signal read secondly. This difference reflects the amount of electric charges of the floating diffusion FD stored by the photoelectric conversion of the photoelectric conversion element 1511.

Then, the horizontal transfer circuit 155 selects column addresses sequentially and reads the digital signals from the column processing circuit 154. Then, the horizontal transfer circuit 155 outputs the digital signals, which have been read sequentially, to the output circuit 156.

The output circuit 156 amplifies the digital signals input from the horizontal transfer circuit 155. Then, the output circuit 156 outputs the digital signals to the signal processor 16 as the pixel signals SR, SG, SB, and SW of respective colors.

[Specific Example of the Configuration of the Signal Processor 16]

A specific example of the configuration of the signal processor 16 will be described.

FIG. 6 is a block diagram showing an example of the configuration of the signal processor in the first embodiment of the present invention.

As shown in FIG. 6, the signal processor 16 has a pre-processing section 161, a correction processing section 162, a selector 163, a memory section 164, an image processor 165, and a control section 166.

The memory section 164 has first to fourth memories 1641 to 1644. The image processor 165 has a YUV processing section 1651. The control section 166 has a comparison section 1661.

In addition, the pre-processing section 161, the correction processing section 162, and the image processor 165 correspond to the image creating section of the present invention. The YUV processing section 1651 corresponds to an acquisition section of the present invention.

[Details of the Pre-Processing Section 161]

The pre-processing section 161 performs pre-processing described below. Specifically, the imaging section 15 sequentially generates the pixel signals SR, SG, SB, and SW of respective colors with rotation of the optical filter 13. The pixel signals SR, SG, SB, and SW of respective colors from the imaging section 15 are sequentially input to the pre-processing section 161.

For example, the pre-processing section 161 performs black level adjustment, gamma correction, and gain adjustment on the pixel signals SR, SG, SB, and SW of respective colors. The gain adjustment is performed by an AGC (Automatic Gain Control) circuit (not shown), for example. The pre-processing section 161 outputs the pre-processed pixel signals SR, SG, SB, and SW of respective colors, as a pre-processed signal 5161, to the correction processing section 162.

[Details of the Correction Processing Section 162]

The correction processing section 162 performs correction processing described below. Specifically, the correction processing section 162 performs, for example, white balance processing and shading correction on the pre-processed signal S161 which has been pre-processed by the pre-processing section 161. In the shading correction, shading occurring in the lens 11 is corrected. After the correction processing, the correction processing section 162 outputs the corrected pixel signals SR, SG, SB, and SW of respective colors, as a corrected signal S162, to the selector 163.

[Details of the Selector 163]

The selector 163 outputs the corrected signal S162, which has been input from the correction processing section 162, to the memory section 164. The corrected signal 5162 is the pixel signals SR, SG, SB, and SW corrected by the correction processing section 162.

Specifically, when the white pixel signal SW is input to the selector 163, the selector 163 outputs the white pixel signal SW to the first memory 1641. When the red pixel signal SR is input to the selector 163, the selector 163 outputs the red pixel signal SR to the second memory 1642.

When the green pixel signal SG is input to the selector 163, the selector 163 outputs the green pixel signal SG to the third memory 1643. When the blue pixel signal SB is input to the selector 163, the selector 163 outputs the blue pixel signal SB to the fourth memory 1644.

[Details of the Memory Section 164]

The memory section 164 functions as a buffer for outputting the corrected signal S162, which has been input from the correction processing section 162, to the image processor 165. In this case, the memory section 164 outputs the corrected signal 5162 to the image processor 165 in response to an instruction of a timing generator (not shown).

Specifically, the first memory 1641 stores the white pixel signal SW input from the correction processing section 162 through the selector 163 and outputs the white pixel signal SW to the image processor 165.

The second memory 1642 stores the red pixel signal SR input from the correction processing section 162 through the selector 163 and outputs the red pixel signal SR to the image processor 165.

The third memory 1643 stores the green pixel signal SG input from the correction processing section 162 through the selector 163 and outputs the green pixel signal SG to the image processor 165.

The fourth memory 1644 stores the blue pixel signal SB input from the correction processing section 162 through the selector 163 and outputs the blue pixel signal SB to the image processor 165.

[Details of the Image Processor 165]

The red pixel signal SR, the green pixel signal SG, the blue pixel signal SB, and the white pixel signal SW from the first to fourth memories 1641 to 1644 are input to the image processor 165. The image processor 165 performs the above-described image processing on the pixel signals SR, SG, SB, and SW of respective colors.

The YUV processing section 1651 decomposes a color image generated by the image processing into a luminance signal SY and a color difference signal SUV. The luminance signal SY is a signal relevant to the luminance (luminance level). The color difference signal SUV includes a difference (SR-SY) between the luminance signal SY and the red pixel signal SR and a difference (SB-SY) between the luminance signal SY and the blue pixel signal SG, for example.

For example, the luminance signal SY and the color difference signal SUV are input to a display device, such as a monitor. As a result, a color image is displayed on the display device. Both the signals may also be stored in a storage device, such as a memory.

The YUV processing section 1651 outputs the luminance signal SY and the color difference signal SUV as a color image SOUT. In addition, the YUV processing section 1651 outputs the luminance signal SY to the comparison section 1661 of the control section 166.

[Details of the Control Section 166]

The control section 166 performs aperture control, exposure control, and gain control. Here, the exposure control function will be described.

In the standard condition, the control section 166 performs the exposure such that the exposure time of color light and the exposure time of white light are equal.

However, when the brightness of the subject OBJ to be imaged is lower than that in the standard condition (non-standard condition), the signal processor 166 controls the exposure time such that the exposure time of white light is longer than the exposure time of color light. Such a determination regarding the brightness of the subject OBJ to be imaged is performed by the comparison section 1661 of the control section 166.

Specifically, the comparison section 1661 calculates the luminance ratio R (=L1/L2) between the luminance L1 of light received by the imaging section 15 and the luminance L2 of light received by the imaging section 15 in the standard condition. Then, the comparison section 1661 determines whether or not the luminance ratio R is about the defined value 1.0. In addition, the luminance L2 in the standard condition is set beforehand.

At the time of this determination, the comparison section 1661 calculates a difference (|luminance ratio R−1.0|) between the luminance ratio R and the defined value 1.0. For example, if the absolute value of the difference falls within the allowable range δR (for example, δR=0.1) (|luminance ratio R−1.0|<δR), the comparison section 1661 determines that the luminance ratio R is about the defined value 1.0. In other words, the luminance ratio R can be regarded as the defined value 1.0 if the difference is close to 0. The allowable range δR may be appropriately set as long as it is possible to determine whether or not the brightness of the subject OBJ is the standard condition.

In addition, when it is determined that the luminance ratio R is not about 1.0, the comparison section 1661 compares the luminance ratio R with the defined value 1.0.

When the comparison section 1661 obtains a determination result that the luminance ratio R is about 1.0 (R≅1.0), the control section 166 controls the exposure time such that the exposure time of red light, the exposure time of green light, the exposure time of blue light, and the exposure time of white light are equal.

When the comparison section 1661 obtains a determination result that the luminance ratio R is lower than 1.0 (R<1.0), the control section 166 controls the exposure time such that only the exposure time of white light is longer than that in the standard condition. In this case, the control section 166 changes the exposure time of white light over color light according to the luminance ratio R.

On the contrary, when the comparison section 1661 obtains a determination result that the luminance ratio R is higher than 1.0 (R>1.0), the control section 166 controls the exposure time such that only the exposure time of white light is shorter than that in the standard condition.

Hereinafter, the exposure control function will be described in more detail with reference to FIG. 7.

FIG. 7 is a view illustrating the exposure control function of the control section in the first embodiment of the present invention. Hereinafter, the case will be described in which the comparison section 1661 obtains a determination result that the luminance ratio R is lower than 1.0 (R<1.0).

As shown in FIG. 7, in the standard condition, the exposure time of color light is the same (1 time). That is, the exposure time ratio is Rt:Gt:Bt:Wt=1:1:1:1. Accordingly, the control section 166 controls the motor 14 such that the exposure time of red light, the exposure time of green light, the exposure time of blue light, and the exposure time of white light are equally set to 1/240 second, for example. In this case, the frame rate is 1/(1/240+1/240+1/240+1/240)=60 fps.

The sensitivity indicates the sensitivity of the imaging section 15. In order to digitize the sensitivity, the sensitivity is defined by the correction value $\Delta$ (=(SRx+SGx+SBx+SWx)/(SRx+SGx+SBx)). In the standard condition, the value (relative value) of sensitivity is about 2.2.

Here, the sensitivity will be described in detail. The value of the white pixel signal WSx in the arbitrary pixel x is larger than the values of the pixel signals SRx, SGx, and SBx, in many cases, even if the exposure time ratio is Rt:Gt:Bt:Wt=1:1:1:1.

Two points may be mentioned as the reason. First, white light includes light beams over the entire wavelength range, such as red light, green light, and blue light. Accordingly, in the exposure using the white light, the amount of received light of the imaging section 15 is increased more than that in the exposure using color light. Secondly, the amount of red light, green light, and blue light transmitted through the color filter 132 is decreased due to loss caused by the optical properties of the filter itself.

For this reason, the white pixel signal WSx is a larger signal than the other pixel signals SRx, SGx, and SBx in many cases. Accordingly, the sensitivity is larger than that of an imaging section in a normal imaging apparatus. This is because the pixel signal SWx is included in the numerator of the correction value $\Delta$.

The specific value of the sensitivity can be digitized as follows. For example, in the non-standard condition, the exposure time ratio of respective colors is assumed to be Rt:Gt:Bt:Wt=(3/4):(3/4):(3/4):(15/4)=1:1:1:5. In this case, the sensitivity is improved about 3 times that in the standard condition. The value of 3 times can be acquired by an operation of $(3/4+15/4\times\alpha)/(3/4+3/4\times\alpha) \cong 3$. Here, $\alpha$ indicates a correction coefficient. In the present embodiment, the correction coefficient $\alpha$ is 1.2, for example. The correction coefficient a may be appropriately set in consideration of the optical properties of the optical filter 13.

As described above, the sensitivity is defined by the correction value $\Delta$. Since the exposure time of red light, the exposure time of green light, and the exposure time of blue light are equal, the values of the pixel signals SRx, SGx, and SBx of respective colors are assumed to be SRx=SGx=SBx=1. Here, the value of the white pixel signal WSx is assumed to be 3.6, for example, for the above-described reason. The value of the pixel signal WSx is based on the expression of the above-described 3 times×correction coefficient $\alpha$ (=1.2). The value of the white pixel signal WSx may be appropriately set, for example, like 2×correction coefficient $\alpha$. By such values, the value of sensitivity in the standard condition is set to the correction value $\Delta$=(1+1+1+3.6)/(1+1+1)=2.2.

As shown in FIG. 7, when the comparison section 1661 determines that the luminance ratio R is lower than the defined value 1.0 and the luminance ratio R is about the value 0.65 (=TH), the control section 166 controls the exposure time such that the exposure time of white light becomes twice the exposure time of color light. That is, when the brightness of the subject OBJ is about 0.65 times that in the standard condition, the exposure time ratio is Rt:Gt:Bt:Wt=1:1:1:2.

At the time of comparison, the comparison section 1661 calculates a difference (|luminance ratio R-TH|) between the luminance ratio R and the value 0.65. For example, if the absolute value of the difference falls within the allowable range $\delta$TH (for example, $\delta$TH=0.1) (|luminance ratio R-TH|<$\delta$TH), the comparison section 1661 determines that the luminance ratio R is about the value 0.65. Undoubtedly, the allowable range $\delta$TH may be appropriately set according to the sensitivity or the like of the imaging section 15.

In addition, the control section 166 controls the motor 14 such that the exposure time of red light, the exposure time of green light, and the exposure time of blue light are equally set to 1/240 second and the exposure time of white light is set to 1/120 second, for example.

The frame rate is 1/(1/240+1/240+1/240+1/120)=48 fps. The value of the white pixel signal SWx is set to, for example, twice the value of the pixel signal WSx in the standard condition, that is, 3.6×2=7.2. Accordingly, the value of sensitivity is set to the correction value $\Delta$=(1+1+7.2)/(1+1+1)=3.4.

When the comparison section 1661 determines that the luminance ratio R is lower than the defined value 1.0 and the luminance ratio R is about the value 0.39, the control section 166 controls the exposure time such that the exposure time of white light becomes 4 times that of the color light. That is, when the brightness of the subject OBJ is about 0.39 time that in the standard condition, the exposure time ratio of respective colors is Rt:Gt:Bt:Wt=1:1:1:4.

Also in this case, the comparison section 1661 determines whether or not the luminance ratio R is about the value 0.39 on the basis of a difference between the luminance ratio R and the value 0.39. The control section 166 controls the motor 14 such that the exposure time of red light, the exposure time of green light, and the exposure time of blue light are equally set to 1/240 second and the exposure time of white light is set to 1/60 second, for example.

The frame rate is $1/(1/240+1/240+1/240+1/60) \cong 34$ fps. The value of the white pixel signal SWx is set to, for example, 4 times the value of the pixel signal WSx in the standard condition, that is, 3.6×4=14.4. Accordingly, the value of sensitivity is set to the correction value $\Delta$=5.7.

The reference values 0.65 and 0.39 of the luminance ratio R may be appropriately set by the relative value of sensitivity, for example. The value 0.65 may be set as a ratio (2.2/3.4=0.65) between the value of sensitivity in the standard condition and the value of sensitivity when the exposure time doubles, for example. Similarly, the value 0.39 may be set as a ratio (2.2/5.7=0.39) between the value of sensitivity in the standard condition and the value of sensitivity when the exposure time quadruples, for example.

When calculating the luminance, the comparison section 1661 uses the luminance signal SY acquired by the YUV processing section 1651. The pixel signals SRx, SGx, SBx, and SWx of respective colors are generated by an arbitrary single pixel. Accordingly, the YUV processing section 1651 calculates the average value of the pixel signals SR, SG, SB, and SW acquired from all pixels, for example. In addition, the comparison section 1661 sets the average value as the luminance signal SY. Instead of the average value, the YUV processing section 1651 may calculate the distribution of the pixel signals SRx, SGx, SBx, and SWx.

Moreover, when the comparison section 1661 obtains a determination result that the luminance ratio R is higher than the defined value 1.0 (R>1.0), the control section 166 controls the motor 14 such that the exposure time of white light is shorter than that of color light.

In this case, the control section 166 controls the exposure time such that the exposure time of white light is half of that of color light, for example. That is, the exposure time ratio of respective colors is Rt:Gt:Bt:Wt=1:1:1:(1/2). The control section 166 controls the motor 14 such that the exposure time of red light, the exposure time of green light, and the exposure time of blue light are equally set to 1/240 second and the exposure time of white light is set to 1/480 second, for example. In addition, the exposure time of white light may be set to 0.

In any case, the exposure time is controlled such that the exposure time of red light, the exposure time of green light, and the exposure time of blue light are equally set (Rt:Gt:Bt=1:1:1).

The exposure time of white light over color light shown in FIG. 7 may be appropriately set according to the luminance ratio R, for example, may be set to 6 times.

[Example of an Operation of the Signal Processor 16]

An example of an operation of the signal processor 16 will be described with reference to FIGS. 8 to 10B.

Figure 8:
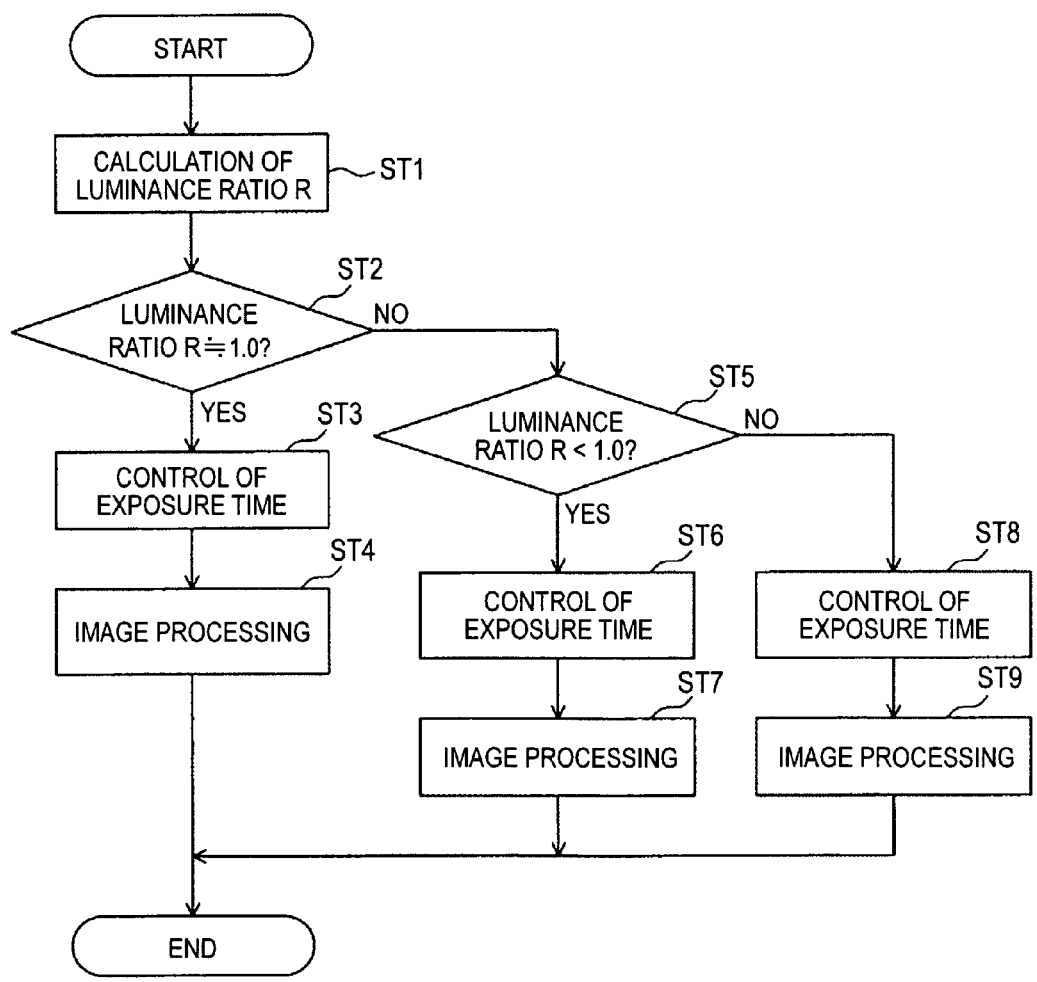
FIG. 8 is a flow chart showing an example of the operation of the signal processor in the first embodiment of the present invention.

FIG. 8 is a flow chart showing an example of the operation of the signal processor in the first embodiment of the present invention.

Figure 9A:
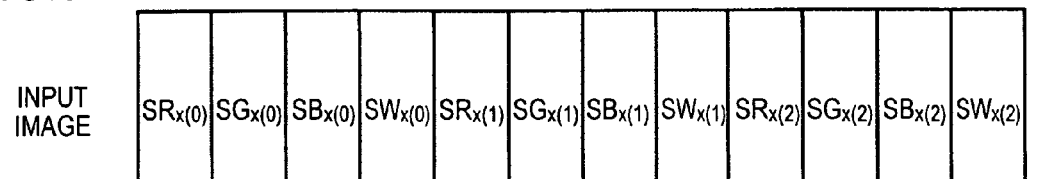
FIGS. 9A and 9B are views showing an example of processing in step ST4 shown in FIG. 8.
Figure 9B:
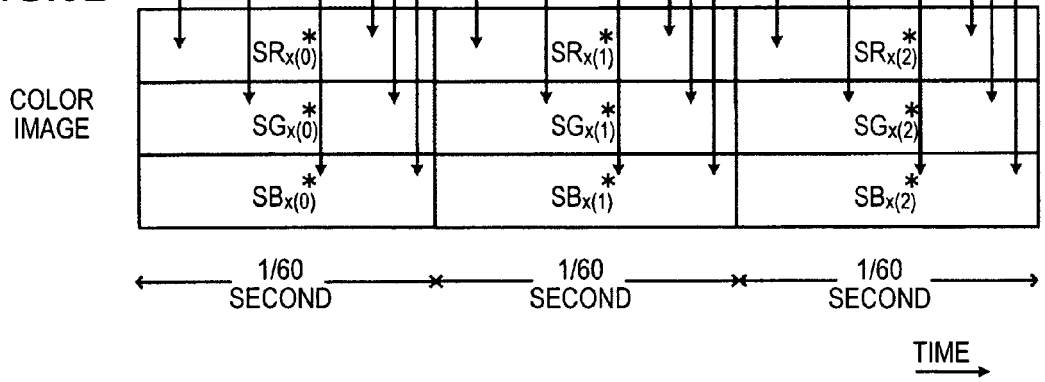

FIGS. 9A and 9B are views showing an example of processing in step ST4 shown in FIG. 8.

Figure 10A:
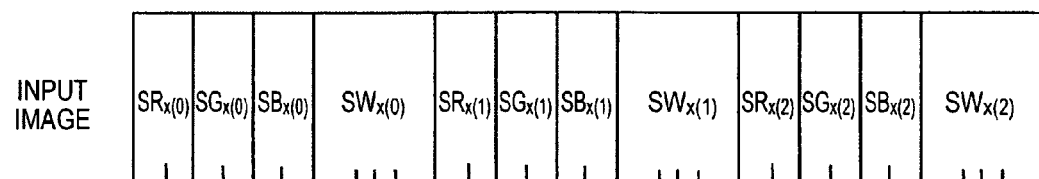
FIGS. 10A and 10B are views showing an example of processing in step ST7 shown in FIG. 8.
Figure 10B:
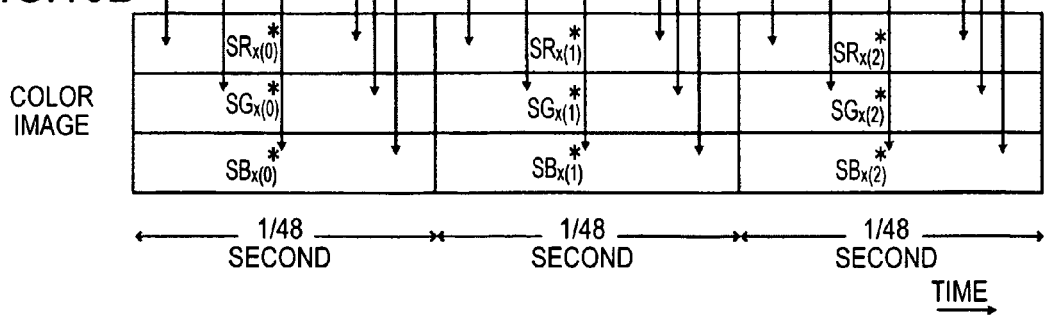

FIGS. 10A and 10B are views showing an example of processing in step ST7 shown in FIG. 8.

As shown in FIG. 8, the exposure control starts. In order to clarify the explanation, it is assumed that the image processor 165 acquired a color image beforehand by a function, such as preview. Then, the YUV processing section 1651 outputs the luminance signal SY to the comparison section 1661 of the control section 166.

The exposure is not sufficient in a non-standard condition. Accordingly, a determination on whether or not the subject OBJ is in a standard condition is performed.

Specifically, the comparison section 1661 calculates the luminance ratio R (=L1/L2) between the luminance L1 of light received by the imaging section 15 and the luminance L2 of light received by the imaging section 15 in the standard condition (step ST1). Then, the comparison section 1661 determines whether or not the luminance ratio R is about the defined value 1.0 (step ST2).

When the comparison section 1661 obtains a determination result that the luminance ratio R is about the defined value 1.0 (R≅1.0), the brightness of the subject OBJ is a standard condition. The control section 166 controls the motor 14 such that the exposure time of red light, the exposure time of green light, the exposure time of blue light, and the exposure time of white light are equally set to 1/240second, for example (step ST3).

As a result, the optical filter 13 rotates counterclockwise around the axial center O such that the exposure time ratio of respective colors is set to Rt:Gt:Bt:Wt=1:1:1:1. Then, the red light, the green light, the blue light, and the white light are sequentially incident on the imaging section 15. Then, the imaging section 15 generates an analog signal of each color whenever light of each color is received. Then, the imaging section 15 outputs digital signals of respective colors to the signal processor 16 as the pixel signals SR, SG, SB, and SW.

Then, the signal processor 16 performs image processing on the pixel signals SW, SR, SG, and SB input from the imaging section 15 (step ST4).

Specifically, the pre-processing section 161 performs pre-processing on the pixel signals SW, SR, SG, and SB, and then the correction processing section 162 performs correction processing on the pre-processed pixel signals SW, SR, SG, and SB.

Then, the selector 163 outputs the pixel signals SW, SR, SG, and SB, which have been corrected by the correction processing section 162, to the memory section 164 separately.

Then, the memory section 164 outputs the pixel signals SW, SR, SG, and SB to the image processor 165 in response to an instruction of a timing generator.

As shown in FIG. 9A, pixel signals SRx(0), SGx(0), SBx(0), and SWx(0) are sequentially input to the image processor 165 for one frame period (1/60 second). For example, the pixel signal SRx(0) is a pixel signal generated by a pixel on a 0-th column among arbitrary columns. Pixel signals SRx(1), SGx(1), SBx(1), and SWx(1) are sequentially input for the next one frame period. Thus, the pixel signals SRx, SGx, SBx, and SWx are sequentially input to the image processor 165 by the number of pixels from the pixel on the 0-th column. In addition, as shown in FIG. 9A, the exposure time ratio of respective colors is Rt:Gt:Bt:Wt=1:1:1:1.

As shown in FIG. 9B, the image processor 165 performs operation processing, which is expressed by the expressions (1) to (4), for every frame period and mixes the pixel signals SRx*, SGx*, and SBx* for every pixel. In FIG. 9B, for example, the pixel signal SRx(0)* is a pixel signal to be generated corresponding to the pixel signal SRx(0). Thus, a final color image in the standard condition is created.

On the other hand, when the luminance ratio R is not about the defined value 1.0 in step ST2 (NO), the comparison section 1661 determines whether or not the luminance ratio R is lower than the defined value 1.0 (step ST5).

When the comparison section 1661 obtains a determination result that the luminance ratio R is lower than the defined value 1.0 (R<1.0) (YES), the control section 166 controls the exposure time such that only the exposure time of white light is longer than that in the standard condition (step ST6).

Here, if the comparison section 1661 determines that the luminance ratio R is about the value 0.65, the control section 166 controls the motor 14 such that the exposure time of red light, the exposure time of green light, and the exposure time of blue light are equally set to 1/240second and the exposure time of white light is set to 1/120second, for example.

As a result, the optical filter 13 rotates counterclockwise around the axial center O such that the exposure time ratio of respective colors is set to Rt:Gt:Bt:Wt=1:1:1:2.

Here, if the comparison section 1661 determines that the luminance ratio R is about the value 0.39, the control section 166 controls the motor 14 such that the exposure time of red light, the exposure time of green light, and the exposure time of blue light are equally set to 1/240second and the exposure time of white light is set to 1/60second, for example.

As a result, the optical filter 13 rotates counterclockwise around the axial center O such that the exposure time ratio of respective colors is set to Rt:Gt:Bt:Wt=1:1:1:4.

Then, as described above, the pixel signals SW, SR, SG, and SB generated by the imaging section 15 are input to the image processor 165.

Then, the signal processor 16 performs image processing on the pixel signals SW, SR, SG, and SB input from the imaging section 15, in the same manner as in step ST4 (step ST7).

However, one frame period in step ST7 is different from that in step ST4. Here, an operation of the image processor 165 when the comparison section 1661 determines that the luminance ratio R is about the value 0.65 will be described.

As shown in FIG. 10A, pixel signals SRx(0), SGx(0), SBx(0), and SWx(0) are sequentially input for one frame period (1/48 second). As described in step ST4, the pixel signals SRx, SGx, SBx, and SWx are sequentially input to the image processor 165 by the number of pixels from the pixel on the 0-th column. In addition, as shown in FIG. 10A, the exposure time ratio of respective colors is Rt:Gt:Bt:Wt=1:1:1:2.

As shown in FIG. 10B, the image processor 165 performs operation processing, which is expressed by the expressions (1) to (4), for every frame period and mixes the pixel signals SRx(n), SGx(n), and SBx(n) for every pixel. Thus, a final color image in a non-standard condition is created.

On the other hand, when the comparison section 1661 obtains a determination result that the luminance ratio R is higher than the defined value 1.0 in step ST5 (R>1.0) (NO), the control section 166 controls the exposure time such that only the exposure time of white light is shorter than that in the standard condition (step ST8).

Then, the image processor 165 of the signal processor 16 performs operation processing, which is expressed by the expressions (1) to (4), for every frame period and mixes the pixel signals SRx(n), SGx(n), and SBx(n) for every pixel (step ST9).

According to the present embodiment, the following effects can be acquired. As described previously, in a normal field sequential imaging apparatus, exposure using white light is not performed. Accordingly, if the exposure time of red light, green light, and blue light is doubled, the sensitivity of the imaging section is improved about twice but the frame rate is reduced to the half.

On the other hand, in the imaging apparatus 1 according to the present embodiment, the frame rate is 34 fps when the exposure time of white light is 4 times that of color light, as shown in FIG. 7. The sensitivity is about 5.7. Although the exposure time is 4 times, the frame rate has not reached even half of that in the standard condition. In this case, the sensitivity is still 2.6 ($\cong$7/2.2) times the sensitivity in the standard condition.

By performing the exposure using white light as described above, a high-sensitivity color image can be acquired even if the resolution over time is reduced. Even if the exposure time of each light beam is equal, the sensitivity is improved more than that of a normal imaging apparatus.

In an imaging apparatus in which a color filter is provided on the imaging surface of an imaging section, for example, a red filter, a green filter, a blue filter, and a white filter are arrayed in the Bayer arrangement. In such an imaging apparatus, it is difficult to change only the exposure time of specific color (for example, white light) when a subject is dark.

However, since the imaging apparatus 1 according to the present embodiment uses the optical filter 13, the exposure time can be changed for each color. Accordingly, only the sensitivity of a white pixel signal can be adjusted by changing the exposure time of white light.

Generally, the color of a color image tends to become light as the exposure time of white light becomes long. However, since human eyes react more sensitively to the luminance (sensitivity) than to the color difference, the information is obtained a lot from the luminance. When a subject is dark, it is important to identify what the subject is even if the color image is monochrome. From the two points of view, the imaging apparatus 1 according to the present embodiment is useful even if the color of a color image becomes light as a result of an increase in the exposure time of white light.

<2. Second Embodiment>

In the first embodiment, exposure using white light and exposure using color light are performed using the optical filter 13. On the other hand, in a second embodiment, the exposure using white light and the exposure using color light are performed using a light source which emits white light and color light. Hereinafter, a different point from the first embodiment will be described.

Figure 11:
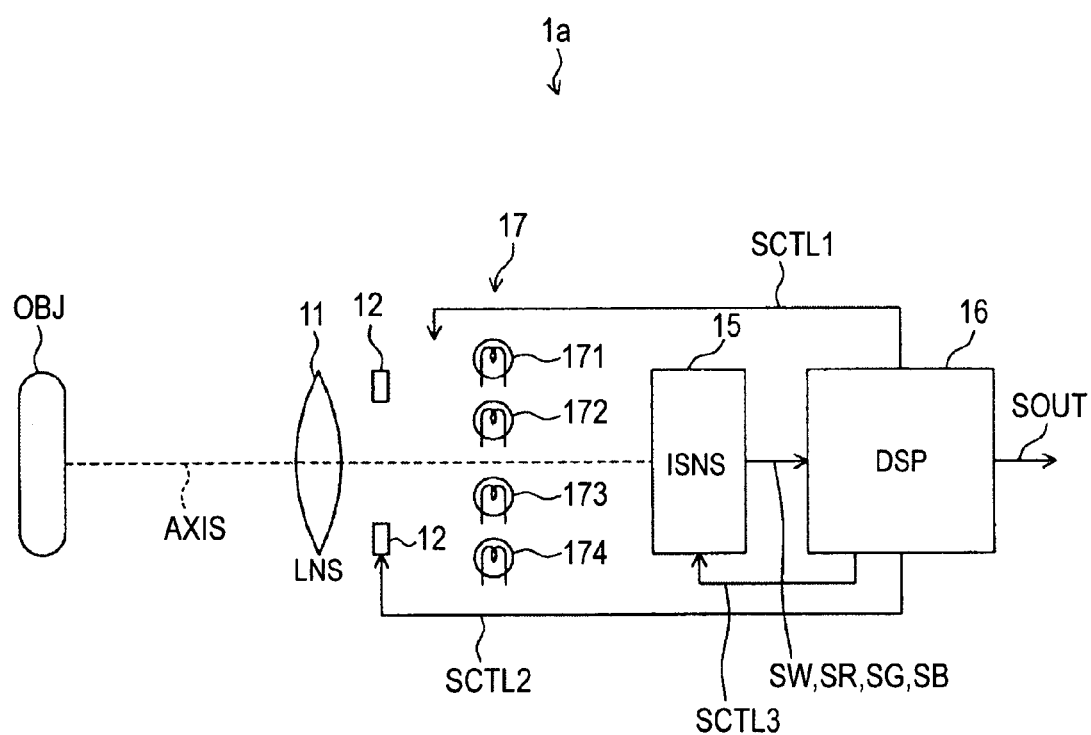
FIG. 11 is a block diagram schematically showing an example of the configuration of an imaging apparatus according to a second embodiment of the present invention.

FIG. 11 is a block diagram schematically showing an example of the configuration of an imaging apparatus according to the second embodiment of the present invention. In FIG. 11, only main sections of an imaging apparatus 1a are shown.

As shown in FIG. 11, the imaging apparatus 1a includes a lens (LNS) 11, an aperture (APT) 12, an optical filter (FIL) 13, an imaging section (ISNS) 15, a signal processor (DSP) 16, and a light-emitting section 17.

Thus, in the imaging apparatus 1a, the light-emitting section 17 is disposed between the aperture 12 and the imaging section 15 instead of the optical filter 13.

The light-emitting section 17 has a white light source 171 which emits white light, a red light source 172 which emits red light, a green light source 173 which emits green light, and a blue light source 174 which emits blue light.

For each of the light sources provided in the light-emitting section 17, an LED (Light Emitting Diode) is used, for example. This light-emitting section 17 is controlled by a control signal SCTL1 output from the signal processor 16.

A specific example is as follows. When the comparison section 1661 obtains a determination result that the luminance ratio R is about the defined value 1.0 (R$\cong$1.0), the control section 166 controls the light-emitting section 17 as follows. Specifically, the control section 166 makes the white light source 171, the red light source 172, the green light source 173, and the blue light source 174 emit light in a sequential manner such that the exposure time of red light, the exposure time of green light, the exposure time of blue light, and the exposure time of white light are equally set to 1/240 second, for example.

When the comparison section 1661 obtains a determination result that the luminance ratio R is lower than the defined value 1.0 (R<1.0), the control section 166 controls the light-emitting section 17 as follows. Here, the comparison section 1661 is assumed to determine that the luminance ratio R is about the value 0.65. In this case, the control section 166 makes the white light source 171, the red light source 172, the green light source 173, and the blue light source 174 emit light in a sequential manner such that the exposure time of red light, the exposure time of green light, and the exposure time of blue light are equally set to 1/240 second and the exposure time of white light is set to 1/120 second, for example.

The order of colors of emitted light may be appropriately set, for example, like red light, green light, blue light, white light, and red light. In addition, when performing exposure using the white light, only the white light source 171 emits light. When performing exposure using the red light, only the red light source 172 emits light. When performing exposure using the green light, only the green light source 173 emits light. When performing exposure using the blue light, only the blue light source 174 emits light.

The light-emitting section 17 has the plurality of light sources 171 to 174 in order to emit color light and white light separately. However, it is also possible to use a light-emitting device which separately emits color light and white light with one light source.

Even if the light-emitting section 17 is used instead of the optical filter 13 as described above, imaging can be performed without reducing the resolution over time similar to the first embodiment.

The signal processor 16 shown in FIG. 6 may be modified in various ways.

A specific example is as follows. For example, the luminance may be directly acquired from the white pixel signal SW (SWx) stored in the first memory 1641 without acquiring the luminance by the YUV processing section 1651.

When the imaging section 15 outputs an analog signal to the signal processor 16, an AD conversion section which converts an analog signal into a digital signal may be provided between the pre-processing section 161 and the correction processing section 162, for example.

The image processor 165 may be made to have a function of compressing a color image. It is possible to convert the digital color image SOUT, which is created by the image processor 165, into an analog signal and to output it to the outside of the imaging apparatus 1.

In the first and second embodiments, white light is used in order to interpolate color light. However, for example, visible light in which a red light component is strong may be used as long as it can be used to interpolate color light.

Although the processing of the signal processor 16 is performed by software, some or all of the processing may be performed by hardware.

The imaging apparatus according to the embodiment of the present invention may be used not only for a camera but also for an endoscope, for example.

The present application contains subject matter related to that disclosed in Japanese Priority Patent Application JP 2009-016831 filed in the Japan Patent Office on Jan. 28, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus comprising:
an imaging section having at least one pixel which receives color light and interpolation light including at least a part of a wavelength range of the color light in order to interpolate the brightness of the color light and which converts each of the received color light and interpolation light into a signal;
a control section which controls a first exposure time of the color light and a second exposure time of the interpolation light at the at least one pixel separately according to the brightness of an object to be imaged, which is to be imaged by the imaging section; and
an image creating section which creates an image on the basis of a color signal, which is output at the at least one pixel when the at least one pixel of the imaging section receives the color light, during the first exposure time controlled by the control section and on the basis of an interpolation signal, which is output at the at least one pixel when the at least one pixel of the imaging section receives the interpolation light, during the second exposure time controlled by the control section.

2. The imaging apparatus according to claim 1, further comprising:
an acquisition section which acquires the luminance of the object to be imaged; and
a comparison section which compares the luminance acquired by the acquisition section with a defined value,
wherein when a comparison result of the comparison section indicates that the luminance is lower than the defined value, the control section controls the first exposure time and the second exposure time separately such that the second exposure time of the interpolation light is longer than the first exposure time of the color light.

3. The imaging apparatus according to claim 2,
wherein the color light includes first color light having a first wavelength range, second color light having a second wavelength range, and third color light having a third wavelength range,
a filter section including a first filter which transmits the first color light, a second filter which transmits the second color light, a third filter which transmits the third color light, and an interpolation filter which transmits the interpolation light is provided, and
the control section makes light incident on the first to third filters during the first exposure time and incident on the interpolation filter during the second exposure time so that the imaging section receives the first color light, the second color light, the third color light, and the interpolation light selectively according to the comparison result of the comparison section.

4. The imaging apparatus according to claim 2,
wherein the color light includes first color light having a first wavelength range, second color light having a second wavelength range, and third color light having a third wavelength range,
a light-emitting section capable of selectively emitting the first color light, the second color light, the third color light, and the interpolation light is provided, and
the control section makes the light-emitting section emit the first to third color light during the first exposure time and emit the interpolation light during the second exposure time so that the imaging section receives the first color light, the second color light, the third color light, and the interpolation light selectively according to the comparison result of the comparison section.

5. The imaging apparatus according to claim 1 or 2, further comprising:
an acquisition section which acquires the luminance of the object to be imaged; and
a comparison section which compares the luminance acquired by the acquisition section with a defined value,
wherein when a difference between the luminance and the defined value falls within an allowable range, the control section controls the first exposure time and the second exposure time separately such that the first exposure time of the color light and the second exposure time of the interpolation light are equal.

6. The imaging apparatus according to claim 1, further comprising:
an acquisition section which acquires the luminance of the object to be imaged; and
a comparison section which compares the luminance acquired by the acquisition section with a defined value,
wherein when a comparison result of the comparison section indicates that the luminance is higher than the defined value, the control section controls the first exposure time and the second exposure time separately such that at least the second exposure time of the interpolation light is shorter than the first exposure time of the color light.

7. The imaging apparatus according to claim 1,
wherein the color light includes first color light having a first wavelength range, second color light having a second wavelength range, and third color light having a third wavelength range, and
the control section controls the first exposure time of the color light such that exposure time of the first color light, exposure time of the second color light, and exposure time of the third color light are equal.

8. The imaging apparatus according to claim 1,
wherein the image creating section acquires a correction value, which is expressed by a ratio of a sum of a value of the color signal and a value of the interpolation signal to the value of the color signal, and corrects the color signal, which is output when the imaging section receives the color light, with the correction value.

9. An imaging method comprising the steps of:
controlling a first exposure time of color light and a second exposure time of interpolation light, which includes at least a part of a wavelength range of the color light in order to interpolate the brightness of the color light, at at least one pixel separately according to the brightness of an object to be imaged;
receiving the color light and the interpolation light at the at least one pixel and converting each of the received color light and interpolation light into a signal under the control; and
creating an image on the basis of a color signal, which is output at the at least one pixel when the color light is received at the at least one pixel, during the first exposure time under the control and on the basis of an interpolation signal, which is output at the at least one pixel when the interpolation light is received the at least one pixel, during the second exposure time under the control.

* * * * *